Oct. 16, 1945.  D. E. BADERTSCHER ET AL  2,386,772
METHOD FOR SEPARATING HYDROCARBONS AND MAKING MERCAPTANS
Filed June 29, 1943  2 Sheets-Sheet 1
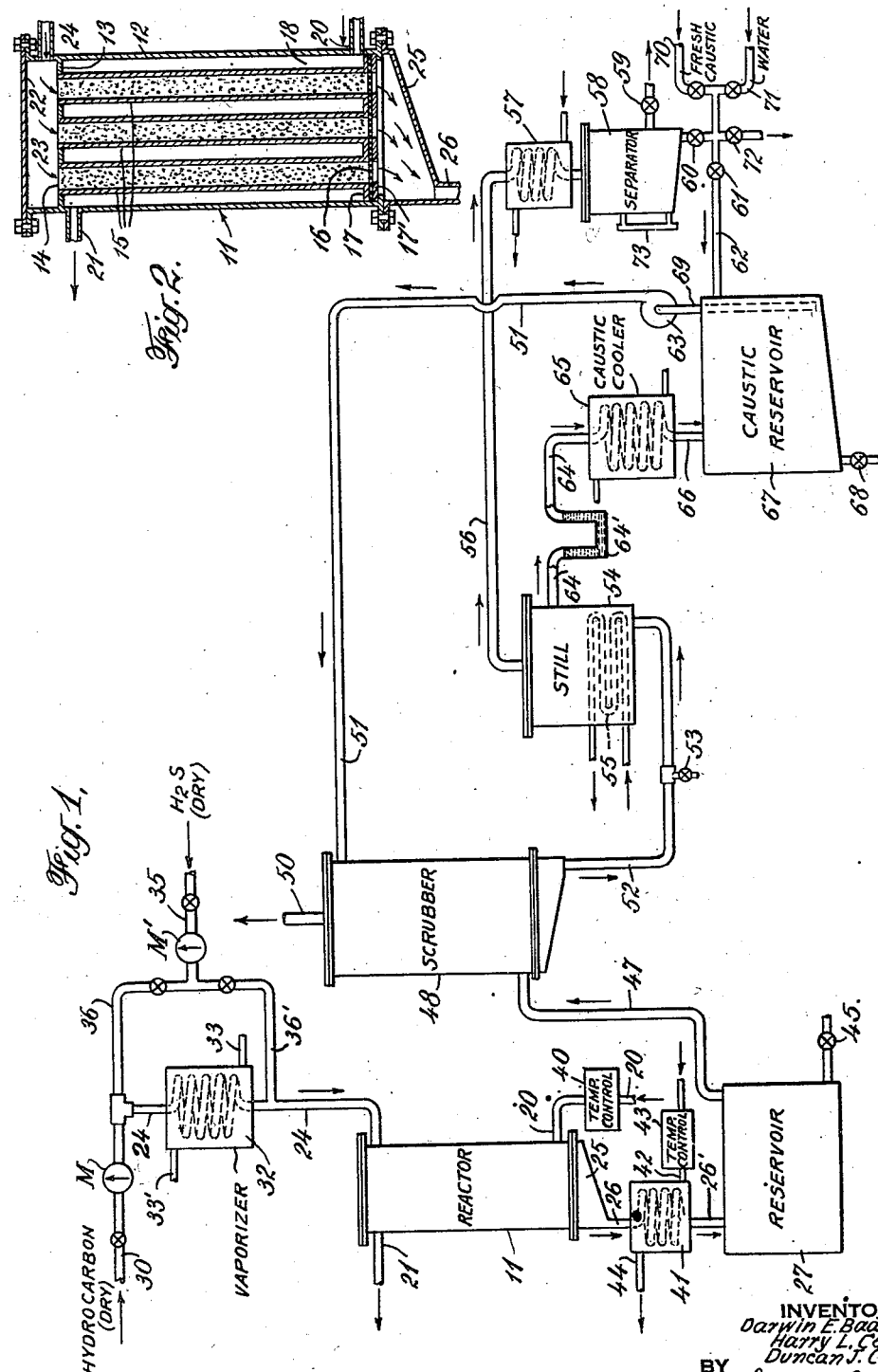
INVENTORS
Darwin E. Badertscher
Harry L. Coonradt
Duncan J. Crowley
BY
Donald L. Dickerson
ATTORNEY

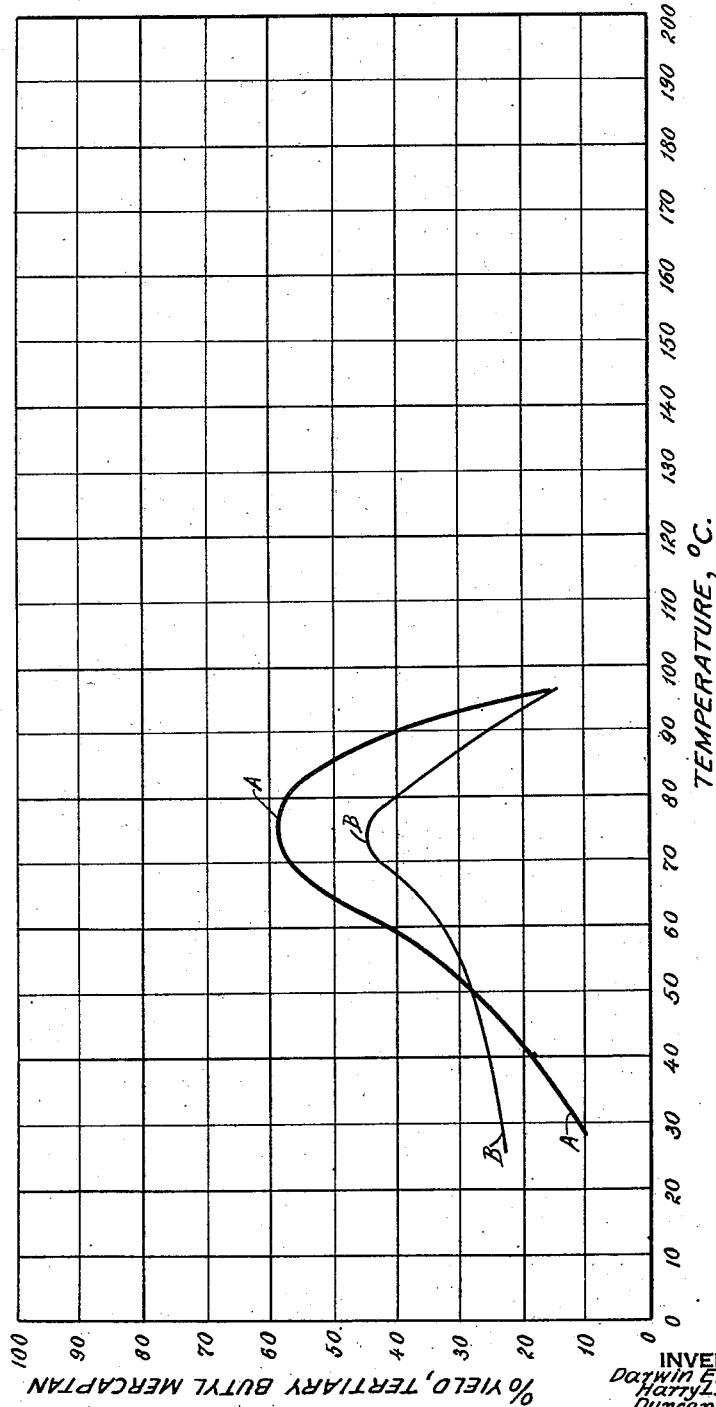

Patented Oct. 16, 1945

2,386,772

UNITED STATES PATENT OFFICE 2,386,772

METHOD FOR SEPARATING HYDROCARBONS AND MAKING MERCAPTANS

Darwin E. Badertscher, Woodbury, N. J., Harry L. Coonradt, Camp Lee, Va., and Duncan J. Crowley, Penns Grove, N. J., assignors to Socony-Vacuum Oil Company, Incorporated, a corporation of New York Application June 29, 1943, Serial No. 492,670

19 Claims. (Cl. 260—609)

This application is a continuation-in-part of our application Serial No. 461,116, filed October 7, 1942, and has to do with a selective catalytic method for effecting the separation of certain olefins from hydrocarbon mixtures. More specifically, the present invention has to do with a vapor phase, catalytic treatment of a hydrocarbon mixture with $H_2S$ whereby only those hydrocarbons of a sub-class of olefins, hereinafter defined as the "tertiary base" olefins, are converted to their corresponding mercaptans.

It is well known to those familiar with the art that olefins will react with $H_2S$ in the presence of various catalysts to form mercaptans. For example, it has been suggested that olefins of at least eight carbon atoms will react in the liquid phase in the presence of certain catalysts, at time intervals of from 6 to 72 hours, to form sulfur-containing compounds including sulfides and mercaptans. The present invention distinguishes over the foregoing in that our catalytic treatment is carried out in the vapor phase with a very brief contact time which may vary from a fraction of a second to about several minutes. It has also been suggested (U. S. Patent 1,836,170) that liquid olefins will react with $H_2S$ in the presence of certain catalysts, such as sulfuric acid, at temperatures within the range of 32° F. to about 100° F. (0° C. to about 38° C.), to form sulfur-containing compounds including mercaptans. The present invention distinguishes over this teaching in that our catalytic treatment with sulfuric acid is carried out in the vapor phase and is extremely effective at temperatures in excess of the foregoing temperature range.

Another fundamental distinction between previously proposed processes and the novel process of the present invention is predicated upon our discovery that the catalytic process contemplated herein is selective for the conversion of certain olefins to their corresponding mercaptans. For example, the present invention is based upon the discovery that the C—4 and C—5 tertiary base olefins, isobutylene, trimethyl ethylene and unsymmetrical methyl ethyl ethylene (of which the latter two are tertiary base amylenes), contained in a mixture of hydrocarbons are converted to their corresponding tertiary mercaptans when the hydrocarbon mixture in the vapor phase and in admixture with $H_2S$ is passed over a suitable catalyst with the temperature of the catalyst or reaction zone maintained within certain preferred limits, depending upon the nature of the catalyst, the pressure in the reaction zone, etc. Accordingly, the process of the present invention may be employed to treat a mixture of hydrocarbons for ultimate use in an operation where the tertiary base olefins, such as isobutylenes and tertiary base amylenes, are harmful contaminants, and to effect the removal of such contaminants, at the same time producing valuable organic chemicals from the tertiary base olefins removed. It has been shown, for example, that isobutylene in a butene mixture retards the formation of olefin-$SO_2$ polysulfone resins and the process of the present invention may be used to provide a butene mixture devoid of isobutylene for use in such resinifying reaction.

"Tertiary base" olefins are defined herein as those olefins characterized by the presence of the tertiary olefin linkage

where R is a low molecular weight alkyl group, such as methyl. Typical members of this class, and preferred herein are isobutylene,

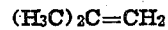

and trimethyl ethylene

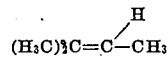

The present invention also provides a highly effective and economical method for obtaining the individual tertiary mercaptan from its corresponding tertiary base olefin, i. e., tertiary butyl mercaptan from isobutylene, and tertiary amyl mercaptan from trimethyl ethylene and unsymmetrical methyl ethyl ethylene, respectively. These tertiary mercaptans may be obtained as an incident to the separation of the corresponding tertiary base olefins from a hydrocarbon mixture as aforesaid, or they may be obtained by the vapor phase reaction of the pure tertiary base olefin with hydrogen sulfide under similar conditions in the same catalytic environment.

The catalysts which we have found to be effective for the purposes of this invention are the following: acids and thioacids of phosphorus and their anhydrides and thioanhydrides, elementary (red) phosphorus, sulfuric acid and organic sulfonic acids, non-plastic clay-type catalysts typified by fuller's earth, alumina-silica type synthetic catalysts and halogenated acids, such as trichloracetic, etc. For the purposes of the present invention, preference is given herein to sulfuric acid and organic sulfonic acids; other catalysts are made the subject matter of companion applications. There is little, if any, diminution in the effectiveness of sulfuric acid and organic sulfonic acids as used herein. Naturally, the presence of appreciable amounts of moisture in the reactants would tend to leach out sulfuric acid and organic sulfonic acids. Therefore, it is desirable to dry the gases prior to contacting them with the catalyst. The drying of the gases prior to introduction into the reactor presents no difficulties and is routine procedure to those familiar with the chemical and petroleum arts. It is preferred that sulfuric acid be adsorbed on a catalytically-inert carrier.

Illustrative of the organic sulfonic acids which serve the purposes of this invention are benzene sulfonic acid, p-toluene sulfonic acid, tertiary butyl sulfonic acid, etc. Particularly preferred of such acids is benzene sulfonic acid.

We have discovered that the reaction of hydrogen sulfide with a tertiary base olefin to form a tertiary mercaptan by the process contemplated herein is quite sensitive to temperature as a means for controlling the yield of mercaptan, and it is a further important object of this invention to provide a process of the class described wherein the temperature is controlled to afford a maximum yield of the mercaptan.

Further details in a preferred procedure for carrying out the process contemplated by this invention may be obtained from the following description taken with accompanying drawings, which are chosen for illustrative purposes only and in which: Figure 1 is a diagrammatic view illustrating one form of apparatus which may be employed in practicing the process of this invention; Figure 2 is a sectional elevation showing in enlarged detail a typical form of reactor which may be employed in the system shown in Figure 1; and Figure 3 is a graph with curves A and B showing the effect of temperature variations upon the yield of tertiary butyl mercaptan in the process contemplated herein.

In Figure 1, reference numeral 11 indicates a reactor which is shown in Figure 2 as embodying a shell 12 which may be of circular or other suitable cross-sectional shape, such shell being provided near its top with a partition plate 13 having a plurality of openings 14, which receive the upper ends of tubes 15 secured therein in any suitable manner, such as welding (not shown). The lower ends of the tubes 15 are supported in openings 16 through a bottom partition plate 17 secured near the bottom of the shell 12 in any suitable manner so as to form a chamber 18 in the shell between plates 17 and 13. For the purpose of controlling the temperature within the tubes 15, a suitable heat exchange medium is circulated through the chamber 18 from an inlet 20 to an outlet 21.

The top of the chamber or shell 12 is provided with a cover 22, which with the top partition plate 13 forms a chamber 23 in the top of the shell adapted to receive reaction vapors through an inlet 24, which vapors enter the various tubes from the chamber 23, as indicated by the arrows. The bottom of the shell 12 is provided with a bottom cover 25, through which the products of reaction pass from the tubes 15 into the product outlet 26.

The bottoms of the various tubes 15 are provided with a suitable mesh material to support a body of catalyst indicated by the stippling in Figure 2 within these tubes. This mesh material may be supported in any suitable manner and, as shown in Figure 2, comprises a screen supported beneath the bottom plate 17 by a similarly perforated plate 17'.

As aforesaid, the reaction contemplated herein is quite sensitive to temperature control; and although the length and size of the reaction tubes 15 and the relation between the total volume of the chamber 18 and the volume within such chamber which is occupied by the reaction tubes may be varied over relatively wide limits, it is to be understood that the relationship between these various factors, the temperature of the heat exchange medium, and the rate at which the heat exchange medium is circulated through the chamber 18 should be so adjusted as to maintain the temperature in the reaction zones of the various catalyst tubes 15 within the range for most efficient operation, as will be hereinafter discussed.

Referring back to Figure 1: reference numeral 30 indicates a conduit adapted to carry hydrocarbons through a meter M into the reactor inlet conduit 24. This conduit is shown as passing through a pre-heater or vaporizer 32 through which a hot heat exchange medium is circulated by means of connections 33 and 33'. Hydrogen sulfide is introduced into the system through the valved connection 35 and a meter M', such hydrogen sulfide being optionally introduced into the inlet 24 on either side of the vaporizer 32 by means of valved connection 36 or 36'.

With regard to the vaporizer or pre-heater 32, it is to be understood that other suitable means may be provided for insuring that the reactants are in the vapor phase when they pass into the catalyst tubes in the reactor. For example, it may be found, particularly after the reaction has been started, that there is sufficient heat in the reactor itself to effect this vaporization, or heater coils may be provided in the chamber 23, as will readily appear to those skilled in the art.

Suitable means for controlling the temperature of the heat exchange medium entering the reactor through inlet 20 are indicated by reference numeral 40. The temperature-control means 40 may be any suitable heat exchange device and can be either manually or automatically operated in any manner well known to those skilled in the art. Also, if desired, the heat exchange medium may be recirculated from the outlet 21 through the temperature control 40 to the inlet 20 as will be obvious to those skilled in the art. Any suitable heat exchange medium, such as water, may be employed to control the temperature in the chamber 18 of reactor 11.

Reference numeral 41 indicates a cooler or condenser through which the product-outlet conduit 26 passes into conduit section 26', which opens into a sealed receiving chamber 27. The cooler or condenser 41 is provided with an inlet 42 equipped with temperature-controlling means 43 and with a heat exchange medium-outlet connection 44. The temperature of the cooler 41 may be controlled through the control 43 so as to condense substantially all of the mercaptan which can then be withdrawn together with the polymerization products of reaction from the sealed chamber 27 through a valved liquid-outlet connection 45, or such temperature in the cooler 41 may be controlled so that only the high boiling products are condensed, substantially all of the mercaptan together with the hydrogen sulfide and hydrocarbon gases being conducted in such case from the sealed chamber 27 through a vapor-outlet conduit 47 to the bottom of a scrubbing tower 48.

The top of the scrubbing tower 48 is provided with a gas vent 50 and an inlet conduit 51 for a scrubbing solution such as aqueous caustic soda. The bottom of the scrubber 48 has an outlet 52 which connects with the bottom of a still or stripper 54. Outlet connection 52 is equipped with a drainage valve 53. The still or stripper 54 is shown as being equipped with a high-pressure steam coil or other suitable source of heat 55 and has an outlet 56 which connects through a condenser 57 with a separator 58. The separator 58 is provided with a valved mercaptan outlet 59, a gauge glass 73 to facilitate removal of the mercaptan, and a valved water outlet 60. The water outlet 60 connects through a valve 61 with a water return pipe 62, which in turn is shown as connecting with the caustic reservoir 67. The still 54 is shown as being equipped with a caustic outlet conduit 64 which includes a liquid caustic well 64', the purpose of which is to prevent mercaptan vapor from leaving still 54 by the conduit 64. Caustic passes through conduit 64 to a caustic cooler 65 and exits therefrom through outlet 66 to the caustic reservoir 67. The caustic reservoir is fitted with a drainage means 68. The caustic reservoir is also equipped with a conduit 69 which connects with the intake side of a pump 63. The discharge side of pump 63 is shown as connecting with inlet conduit 51 of scrubber 48. Means indicated at 70 are provided for adding fresh caustic when desired; and means indicated at 71 are provided for adding fresh water to the system. A water drain is shown at 72, and the last-described connections are shown as being provided with suitable valves for controlling the addition or discharge of the various media.

In practicing the process contemplated herein with an apparatus of the type shown in Figures 1 and 2, the tertiary base olefin, either alone or in admixture with other hydrocarbons, and the hydrogen sulfide are metered into the system through meters M and M'. The proportions of these two reactants may be varied over relatively wide limits, but for optimum results it is preferred that these proportions be such that the hydrogen sulfide be slightly in excess of the molar equivalent required to react with the tertiary base olefin present.

The admixture of hydrocarbon and $H_2S$ is introduced into the reactor 11 in the vapor phase, as by passing the hydrocarbon through the vaporizer 32 prior to admixture with $H_2S$. Upon entering the reactor 11, the hydrocarbon-$H_2S$ vapor mixture passes through the catalyst tubes 15 where it contacts the catalyst for a short period of time. It is a feature of the process contemplated herein that the period of catalyst contact is very short. With a catalyst of the type described hereinabove, contact times of from about a fraction of a second to about several minutes serve the purposes of this invention, but in general, a contact time of a few seconds is preferred. The temperature of the heat transfer medium in chamber 18 is controlled by the temperature control 40 so that the temperature of the catalyst zone within the tubes 15 is maintained within the range that will give the desired conversion. As aforesaid, the process contemplated herein is quite sensitive to temperature. We have found, for example, that the process is operative between the limits of atmospheric temperature (at about 25° C.) and about 100° C., but for optimum conversion a more closely defined range of temperature is necessary. This will be discussed in further detail hereinafter.

When in contact with the catalyst in the catalyst tubes 15 under the conditions described herein, the tertiary base olefin reacts with the hydrogen sulfide in the reaction mixture to form the corresponding tertiary mercaptan. For example, when the hydrocarbon used is isobutylene, tertiary butyl mercaptan is formed and also a small amount of higher boiling materials which are mainly polymers of isobutylene. Thus, the effluent gases leaving the reactor 11 through discharge conduit 26 contain tertiary butyl mercaptan, high boiling materials, traces of unreacted $H_2S$ and traces of unreacted isobutylene. Similarly, when the hydrocarbon used is tertiary base amylene, tertiary amyl mercaptan is formed and the effluent gases will contain unreacted $H_2S$, unreacted tertiary base amylene and polymers of said amylene in addition to this mercaptan. When the hydrocarbon used is a hydrocarbon mixture containing a tertiary base olefin (or tertiary base olefins), such as for example isobutylene, secondary olefins, normal olefins, and saturated hydrocarbons, only the tertiary base olefin (or tertiary base olefins) is converted to the corresponding mercaptan. Other hydrocarbons in the mixture are uneffected by contact with the catalyst and $H_2S$. With such a hydrocarbon mixture, the effluent gases contain tertiary butyl mercaptan, higher boiling materials which are predominantly polymers of isobutylene, traces of unreacted $H_2S$ and unreacted isobutylene, and unreacted hydrocarbons, such as normal olefins, secondary olefins and saturated hydrocarbons.

In either case, the effluent gases flow through the discharge conduit 26 to the condenser 41. As aforesaid, the temperature of the condenser may be maintained such that only the high boiling products are condensed, in which case, the condensate flows into the sealed chamber 27 and from which it can then be withdrawn through the outlet connection 45. The unreacted hydrocarbons, unreacted $H_2S$ and the tertiary mercaptan, such as tertiary butyl mercaptan, are not condensed when such a temperature is maintained in the condenser 41, and flow through the vapor-outlet conduit 47 to the bottom of the scrubbing tower 48. If desired, the temperature of the condenser 41 may be adjusted so that the greater portion of the tertiary butyl mercaptan is condensed along with the high boiling materials. This condensate withdrawn through connection 45 may then be distilled in a suitable distillation tower (not shown) to separate the tertiary mercaptan from the polymerization products.

The uncondensed portion of the reaction mixture rises in the scrubber 48 and contacts a downstream of scrubbing solution, such as aqueous caustic soda whereupon tertiary mercaptan (butyl or amyl or both, depending on the tertiary base olefin or olefins in the charge) and hydrogen sulfide are converted respectively to the corresponding soluble alkali mercaptide and alkali sulfide or hydrosulfide. The unreacted hydrocarbons are unaffected by the caustic soda and are removed through the gas vent 50 from which they may be conducted to another operation or treatment such as alkylation, polymerization, or the like. The alkali mercaptide and alkali sulfide or hydrosulfide in caustic solution pass out of the scrubber 48 through the outlet connection 52 to the still 54. High-pressure steam or other heating medium passes through the coil 55 in the still 54, thereby heating the caustic solution to an elevated temperature. On heating the caustic solution, the alkali mercaptide is converted to the corresponding tertiary butyl or tertiary amyl mercaptan which, along with some water, distills from the solution. The tertiary mercaptan-water vapors rise to the outlet line 56, flow therethrough to the condenser 57 where they are condensed and from which the condensate flows to the separator 58. The condensate separates herein (58) into an upper layer of mercaptan, and lower layer of water. The mercaptan layer is withdrawn through the valved outlet 59 to storage or other process, or processes, a gauge glass 73 being provided to facilitate the mercaptan withdrawal.

It will be apparent from the foregoing that when the original hydrocarbon mixture contains a mixture of the preferred tertiary base olefins, isobutylene and trimethyl ethylene, for example, the mercaptan layer withdrawn through the valved outlet 59 will be a mixture of tertiary butyl and tertiary amyl mercaptans. These mercaptans can then be separated from each other by suitable separation means, such as by distillation (means not shown).

The lower water layer is allowed to drain from the bottom of the separator 58, through the water outlet 60. It is recombined, in passing through the valve 61 and the water-return pipe 62, with the caustic solution which has been discharged from the still 54. This caustic solution has passed through conduit 64, well 64', cooler 65, conduit 66 to caustic reservoir 67. This cold caustic solution, which contains some alkali sulfide, combined with water from the separator 58 is pumped by means of the pump 63 to the caustic scrubber 48 through the inlet condiut 51. If, however, said caustic solution from the still 54 tends to accumulate an appreciable amount of alkali sulfide, it can be removed from the system by means of the drain 68, and can be replaced with a desired amount of fresh caustic through the means 70. This is necessary when an appreciable amount of unreacted $H_2S$ is present in the effluent gases from the reactor 11 and which reacts with caustic soda in the scrubber 48 to form alkali sulfide. If it is necessary to introduce additional water into the system to add to the caustic solution cooled in the cooler 65, fresh water can be introduced through the means 71.

The selective action of $H_2S$ upon tertiary base olefins, such as isobutylene and isoamylenes, is influenced by a number of factors such as temperature, pressure, contact time and rate of flow of reactants, proportions of reactants, the catalyst used, etc. As we have previously indicated, temperature is the most important and most critical of these influencing factors. The reaction of the tertiary base olefin, such as isobutylene or isoamylenes, and hydrogen sulfide whereby the corresponding tertiary mercaptan is formed is slightly exothermic. Therefore, in order that the temperature of the reaction mixture be controlled within the desired limits, the heat of reaction should be uniformly and readily withdrawn from the reaction zone. This may be accomplished by a proper control of the temperature and rate of flow of the heat transfer medium in the reactor. The sensitivity of this reaction to temperature in the presence of sulfuric acid is illustrated by the curve in Figure 3.

Referring now to Figure 3, the curves A and B are temperature-yield curves with temperature plotted along the abscissa and yield of tertiary butyl mercaptan plotted along the ordinate. Each point on the curves represents a single preparation of tertiary butyl mercaptan from isobutylene and hydrogen sulfide under the following conditions. A reaction chamber containing a single catalyst tube, inside diameter 22 mm. was used. In each run, three (3) liters per hour of each gas, isobutylene and hydrogen sulfide, were employed. Each run was continuous and varied in duration from 4 to 7.5 hours with contact times from about 4 to about 6 minutes, which was influenced by temperature, catalyst volume, etc. Each yield of tertiary butyl mercaptan was based upon that fraction of reaction product boiling from 63° C. to 66° C. at atmospheric pressure. Appreciable amounts—2 to 6 grams—of elemental sulfur were formed in each run.

Curve A clearly indicates that the process contemplated herein with sulfuric acid as the catalyst is operative over the broad temperature range of 25° C. to about 100° C. A quantity of 95 grams sulfuric acid deposited on 61 grams of wood charcoal was used; and the volume and height in the column were 300 cc. and 80 cm., respectively. It is seen that at atmospheric or room temperature, about 25° C., a yield of about 10% is obtained. The yield increases with increase of temperature until the maximum yield—about 60%—is obtained in the neighborhood of 80° C. Thereafter, further increase of temperature makes for smaller yields until at about 100° C. (96° C. on the curve), the yield is only about 15%. For practical purposes where yields of 40% and greater are desired, the curve indicates that temperatures within the range of about 60° C. to about 90° C. may be used. With a closer regulation of temperature within the range of about 65° C. to about 85° C., maximum yields of 50% or more are obtained.

Curve A also indicates that sulfuric acid is relatively ineffective within the temperature range of 0° C. to 38° C. as proposed in the aforesaid Patent 1,836,170. For example, the greatest yield of mercaptan within the range proposed in said patent is only about 15%, at 38° C.

Similarly, Curve B indicates that the process contemplated herein with an organic sulfonic acid, illustrated by benzene sulfonic acid, is operative over the broad temperature range of 25° C. to about 100° C. In the several preparations represented by the several points on the curve (B), a quantity of 100 grams of benzene sulfonic acid deposited on 75 grams of granulated wood charcoal was used; this occupies about 250 cc. in the catalyst column. It will be seen that at atmospheric or room temperature, about 25° C., a yield of about 20% is obtained; and at about 100° C., a yield of about 15% is obtained. Within these temperatures, 25° C. and 100° C., however, the yields are substantially larger, the maximum yield, about 45%, being obtained at about 75° C.

While Curves A and B were obtained with the operating conditions described above, it will be understood that the slope and breadth of these curves may change with changes in one or more operating conditions. For example, various proportions of reactants may be used instead of three liters of each gas, hydrogen sulfide and isobutylene. In general, however, it appears that these curves substantially represent the catalytic action of sulfuric acid and of organic sulfonic acids in the conversion of the C—4 and C—5 tertiary base olefins to their corresponding tertiary mercaptans.

It is one feature of this invention that high pressures are not required. On the contrary, atmospheric or, at most, pressures only slightly greater than atmospheric are used. In order that the reaction be carried out in the vapor phase, it is necessary that the pressure be less than that pressure at which liquefaction of the hydrocarbon would occur at the operating temperature. It will readily be seen that the use of pressures from about atmospheric to about 4 atmospheres are not such as to require the use of expensive high-pressure reaction chambers. This, of course, is a decided economic advantage.

As aforesaid, the proportions of reactants for our process obviously can be varied considerably. Theoretically, the optimum molar ratio of tertiary base olefin to hydrogen sulfide would be 1:1. In some cases, however, maximum yields are obtained when a slight excess of $H_2S$ is used. Tertiary base olefins are notorious for their tendency to polymerize and this polymerization reaction tends to compete with the addition reaction with the resultant formation of high boiling poly tertiary base olefins. An excess of $H_2S$, therefore, will increase the yield of mercaptan by affording greater opportunity for the tertiary base olefin-$H_2S$ reaction. This factor of the molar ratio of the reactants naturally will be regulated by the economics of the particular case at hand, that is, by the relative costs of hydrocarbon and $H_2S$, and of their handling and recovery.

While it is possible, and is contemplated herein, to use the catalyst without a catalyst support, it is preferred that the catalyst be supported on an adsorbent inert carrier. Many such substances may be used for this purpose, typical of which are wood charcoal, cocoanut charcoal, granulated coke, certain clays which are catalytically inactive for the purposes of this invention (as opposed to active non-plastic clays), silica gel, etc. For example, we have found that wood and cocoanut charcoals exert little, if any, catalytic effect in the methods of separation and preparation contemplated herein. Wood charcoal, under the same conditions used in obtaining the results shown by the curves in Figure 3, had no catalytic effect.

From the foregoing description and examples, it will be seen that the process contemplated herein provides a convenient means for separating tertiary base olefins from a mixture of hydrocarbons which are to be used in subsequent procedures where the tertiary base olefin would be an undesirable contaminant. It also provides an economical process for the synthesis of tertiary mercaptans, such as tertiary butyl mercaptan and tertiary amyl mercaptan from either a hydrocarbon mixture containing the corresponding tertiary base olefin or the corresponding tertiary base olefin in the pure form. If the hydrocarbon reactant contains several tertiary base olefins, the mercaptan product will be a mixture of the corresponding tertiary mercaptans which can be separated into its various components by fractionation.

It is to be understood that this invention is not to be limited to the foregoing typical illustrative examples of the same, but is to be construed broadly as defined by the language of the appended claims.

We claim:

1. The method of making a tertiary mercaptan from a tertiary base olefin selected from the group consisting of isobutylene, trimethyl ethylene and unsymmetrical methyl ethyl ethylene which comprises, passing said tertiary base olefin in the vapor phase with hydrogen sulfide through a reaction zone containing a catalyst selected from the group consisting of an organic sulfonic acid and sulfuric acid, regulating the flow of said reactants through said reaction zone to provide therein a contact time from a fraction of a second to several minutes and maintaining the temperature of said reactants therein between about 50° C. and about 100° C., whereby said tertiary base olefin is converted to the corresponding tertiary mercaptan.

2. The method of making a tertiary mercaptan from a tertiary base olefin selected from the group consisting of isobutylene, trimethyl ethylene and unsymmetrical methyl ethyl ethylene which comprises, passing said tertiary base olefin in the vapor phase with hydrogen sulfide through a reaction zone containing a catalyst selected from the group consisting of an organic sulfonic acid and sulfuric acid, regulating the flow of said reactants through said reaction zone to provide therein a contact time from a fraction of a second to several minutes and maintaining the temperature of said reactants therein between about 60° C. and about 90° C., whereby said tertiary base olefin is converted to the corresponding tertiary mercaptan.

3. The method of making tertiary butyl mercaptan from isobutylene which comprises, passing isobutylene in the vapor phase with hydrogen sulfide through a reaction zone containing a catalyst selected from the group consisting of an organic sulfonic acid and sulfuric acid, regulating the flow of said reactants through said reaction zone to provide therein a contact time from a fraction of a second to several minutes and maintaining the temperature of said reactants therein between about 60° C. and about 90° C., whereby isobutylene is converted to tertiary butyl mercaptan.

4. The method of making tertiary amyl mercaptan from trimethyl ethylene which comprises, passing trimethyl ethylene in the vapor phase with hydrogen sulfide through a reaction zone containing a catalyst selected from the group consisting of an organic sulfonic acid and sulfuric acid, regulating the flow of said reactants through said reaction zone to provide therein a contact time from a fraction of a second to several minutes and maintaining the temperature of said reactants therein between about 60° C. and about 90° C., whereby trimethyl ethylene is converted to tertiary amyl mercaptan.

5. The method of making tertiary amyl mercaptan from unsymmetrical methyl ethyl ethylene which comprises, passing unsymmetrical methyl ethyl ethylene in the vapor phase with hydrogen sulfide through a reaction zone containing a catalyst selected from the group consisting of an organic sulfonic acid and sulfuric acid, regulating the flow of said reactants through said reaction zone to provide therein a contact time from a fraction of a second to several minutes and maintaining the temperature of said reactants therein between about 60° C. and about 90° C., whereby unsymmetrical methyl ethyl ethylene is converted to tertiary amyl mercaptan.

6. The method of making a tertiary mercaptan from a tertiary base olefin selected from the group consisting of isobutylene, trimethyl ethylene and unsymmetrical methyl ethyl ethylene which comprises, passing said tertiary base olefin in the vapor phase with hydrogen sulfide through a reaction zone containing sulfuric acid, regulating the flow of said reactants through said reaction zone to provide therein a contact time from a fraction of a second to several minutes and maintaining the temperature of said reactants therein between about 60° C. and about 90° C., whereby said tertiary base olefin is converted to the corresponding tertiary mercaptan.

7. The method of making a tertiary mercaptan from a tertiary base olefin selected from the group consisting of isobutylene, trimethyl ethylene and unsymmetrical methyl ethyl ethylene which comprises, passing said tertiary base olefin in the vapor phase with hydrogen sulfide through a reaction zone containing an organic sulfonic acid, regulating the flow of said reactants through said reaction zone to provide therein a contact time from a fraction of a second to several minutes and maintaining the temperature of said reactants therein between about 50° C. and about 100° C., whereby said tertiary base olefin is converted to the corresponding tertiary mercaptan.

8. The method of making a tertiary mercaptan from a tertiary base olefin selected from the group consisting of isobutylene, trimethyl ethylene and unsymmetrical methyl ethyl ethylene which comprises, passing said tertiary base olefin in the vapor phase with hydrogen sulfide through a reaction zone containing benzene sulfonic acid, regulating the flow of said reactants through said reaction zone to provide therein a contact time from a fraction of a second to several minutes and maintaining the temperature of said reactants therein between about 50° C. and about 100° C., whereby said tertiary base olefin is converted to the corresponding tertiary mercaptan.

9. The method of selectively separating a tertiary base olefin selected from the group consisting of isobutylene, trimethyl ethylene and unsymmetrical methyl ethyl ethylene from a hydrocarbon mixture containing said tertiary base olefin, a normal olefin, a secondary olefin and a saturated hydrocarbon, which comprises: admixing said hydrocarbon mixture with hydrogen sulfide; passing the reaction mixture thus formed in the vapor phase through a reaction zone containing a catalyst selected from the group consisting of an organic sulfonic acid and sulfuric acid, regulating the flow of said reaction mixture through said reaction zone to provide a very brief contact time therein and maintaining the temperature of said reaction mixture therein between about 25° C. and about 100° C., whereby said tertiary base olefin is converted to the corresponding tertiary mercaptan; and separating said mercaptan from the reaction product so obtained.

10. The method of selectively separating a tertiary base olefin selected from the group consisting of isobutylene, trimethyl ethylene and unsymmetrical methyl ethyl ethylene from a hydrocarbon mixture containing said tertiary base olefin, a normal olefin, a secondary olefin and a saturated hydrocarbon, which comprises: admixing said hydrocarbon mixture with hydrogen sulfide; passing the reaction mixture thus formed in the vapor phase through a reaction zone containing a catalyst selected from the group consisting of an organic sulfonic acid and sulfuric acid, regulating the flow of said reaction mixture through said reaction zone to provide a very brief contact time therein and maintaining the temperature of said reaction mixture therein between about 60° C. and about 90° C., whereby said tertiary base olefin is converted to the corresponding tertiary mercaptan; and separating said mercaptan from the reaction product so obtained.

11. The method of selectively separating a tertiary base olefin selected from the group consisting of isobutylene, trimethyl ethylene and unsymmetrical methyl ethyl ethylene from a hydrocarbon mixture containing said tertiary base olefin, a normal olefin, a secondary olefin and a saturated hydrocarbon, which comprises: admixing said hydrocarbon mixture with hydrogen sulfide; passing the reaction mixture thus formed in the vapor phase through a reaction zone containing sulfuric acid, regulating the flow of said reaction mixture through said reaction zone to provide a very brief contact time therein and maintaining the temperature of said reaction mixture therein between about 60° C. and about 90° C., whereby said tertiary base olefin is converted to the corresponding tertiary mercaptan; and separating said mercaptan from the reaction product so obtained.

12. The method of selectively separating a tertiary base olefin selected from the group consisting of isobutylene, trimethyl ethylene and unsymmetrical methyl ethel ethylene from a hydrocarbon mixture containing said tertiary base olefin, a normal olefin, a secondary olefin and a saturated hydrocarbon, which comprises: admixing said hydrocarbon mixture with hydrogen sulfide; passing the reaction mixture thus formed in the vapor phase through a reaction zone containing an organic sulfonic acid, regulating the flow of said reaction mixture through said reaction zone to provide a very brief contact time therein and maintaining the temperature of said reaction mixture therein between about 25° C. and about 100° C., whereby said tertiary base olefin is converted to the corresponding tertiary mercaptan; and separating said mercaptan from the reaction product so obtained.

13. The method of selectively separating a tertiary base olefin selected from the group consisting of isobutylene, trimethyl ethylene and unsymmetrical methyl ethyl ethylene from a hydrocarbon mixture containing said tertiary base olefin, a normal olefin, a secondary olefin and a saturated hydrocarbon, which comprises: admixing said hydrocarbon mixture with hydrogen sulfide; passing the reaction mixture thus formed in the vapor phase through a reaction zone containing benzene sulfonic acid, regulating the flow of said reaction mixture through said reaction zone to provide a very brief contact time therein and maintaining the temperature of said reaction mixture therein between about 25° C. and about 100° C., whereby said tertiary base olefin is converted to the corresponding tertiary mercaptan; and separating said mercaptan from the reaction product so obtained.

14. In a method for making a tertiary mercaptan by reacting a tertiary base olefin vapor with hydrogen sulfide in the presence of a catalyst selected from the group consisting of an organic sulfonic acid and sulfuric acid, the improvement which comprises: regulating the flow of said olefin vapor and hydrogen sulfide with respect to said catalyst to provide a contact time therein from a fraction of a second to several minutes and maintaining a reaction temperature therein between about 60° C. and about 90° C.

15. In a method for making a tertiary mercaptan by reacting a tertiary base olefin vapor with hydrogen sulfide in the presence of sulfuric acid, the improvement which comprises: regulating the flow of said olefin and hydrogen sulfide with respect to sulfuric acid to provide a contact time therein from a fraction of a second to several minutes and maintaining a reaction temperature therein between about 60° C. and about 90° C.

16. In a method for making a tertiary mercaptan by passing a vapor phase mixture containing a tertiary base olefin and hydrogen sulfide through a reaction zone containing sulfuric acid, the improvement which comprises: regulating the flow of said vapor phase mixture through said reaction zone to provide a contact time therein from a fraction of a second to several minutes and maintaining the temperature of said vapor phase mixture therein between about 60° C. and about 90° C.

17. In a method for making a tertiary mercaptan by passing a vapor phase mixture containing a tertiary base olefin and hydrogen sulfide through a reaction zone containing a catalyst selected from the group consisting of an organic sulfonic acid and sulfuric acid, the improvement which comprises: regulating the flow of said vapor phase mixture through said reaction zone to provide a contact time therein from a fraction of a second to several minutes and maintaining the temperature of said vapor phase mixture therein between about 60° C. and about 90° C.

18. The method of making a tertiary mercaptan from a tertiary base olefin which comprises, passing said olefin in the vapor phase with hydrogen sulfide through a reaction zone containing a catalyst selected from the group consisting of an organic sulfonic acid and sulfuric acid, regulating the flow of said reactants through said reaction zone to provide therein a contact time from a fraction of a second to several minutes and maintaining the temperature of said reactants therein between about 50° C. and about 100° C., whereby said olefin is converted to the corresponding mercaptan.

19. The method of selectively separating a tertiary base olefin selected from the group consisting of isobutylene, trimethyl ethylene and unsymmetrical methyl ethyl ethylene from a hydrocarbon mixture containing said tertiary base olefin and at least one non-tertiary base olefin, which comprises: admixing said hydrocarbon mixture with hydrogen sulfide; passing the reaction mixture thus formed in the vapor phase through a reaction zone containing a catalyst selected from the group consisting of an organic sulfonic acid and sulfuric acid, regulating the flow of said reaction mixture through said reaction zone to provide a very brief contact time therein and maintaining the temperature of said reaction mixture therein between about 25° C. and about 100° C., whereby said tertiary base olefin is converted to the corresponding tertiary mercaptan; and separating said mercaptan from the reaction product so obtained.

DARWIN E. BADERTSCHER.
HARRY L. COONRADT.
DUNCAN J. CROWLEY.